United States Patent Office 3,236,858
Patented Feb. 22, 1966

3,236,858
PROCESS FOR THE PRODUCTION OF
1-ARYL-HYDROPYRAZOLES
Hans Jakob Peterli, Basel-Land, and Hansjörg Heller, Riehen, near Basel, Switzerland, assignors to Geigy Chemical Corporation, Greenburgh, N.Y., a corporation of Delaware
No Drawing. Filed Apr. 26, 1963, Ser. No. 276,075
Claims priority, application Switzerland, May 9, 1962, 5,550/62
6 Claims. (Cl. 260—310)

The present invention concerns a process for the production of 1-aryl-hydropyrazoles, i.e., 1-aryl-pyrazolines and 1-aryl-pyrazolidines. Such 1-aryl-hydropyrazoles have hitherto been produced from the corresponding aryl hydrazines as starting materials. Unsubstituted diamines can be subjected to ring closure by reaction with sodium hypochlorite; however, only low yields of pyrazoline derivatives (about 30%) are obtained in mixture with largely resinified by-products.

It has now been found that, unexpectedly, 1-aryl-hydropyrazoles of the formula

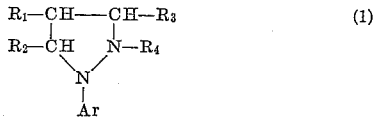

(1)

wherein

Ar represents an aromatic carbocyclic radical with maximally 12 ring carbon atoms in the carbocyclic moiety,
each of $R_1$ and $R_2$ independently represents hydrogen or a lower alkyl radical, and
each of $R_3$ and $R_4$ represents hydrogen or together they represent the direct linkage, can be produced by treating an aryl-substituted diamine of formula

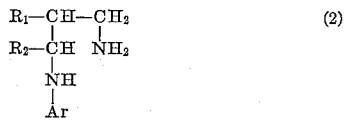

(2)

wherein, Ar, $R_1$ and $R_2$ have the meanings given in Formula 1, with a hypohalogenite as defined below.

"Lower" when used with an aliphatic radical means with from 1 to 4 carbon atoms.

In the above Formulae 1 and 2 Ar is, for example, of the naphthalene or acenaphthene series, preferably, however, of the benzene series; the benzene radical can contain inert substituents. Examples of such substituents are: alkyl, such as methyl, ethyl, propyl, isopropyl, n-, sec-, or tert.-butyl, cycloalkyl such as cyclohexyl, aralkyl such as benzyl, or aryl such as phenyl, as well as substituted phenyl groups; particularly final products of Formulas II and III below, in which $n$ stands for 2, are obtained from compounds of Formula 2 in which Ar is a benzene nucleus which bears the substituent:

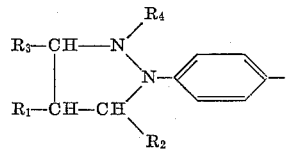

Furthermore, when Ar in Formulas 1 and 2 is a benzene nucleus, it can also be substituted by alkoxy, cycloalkoxy, aralkoxy or aryloxy groups, e.g. the methoxy, ethoxy, cyclohexyloxy, benzyloxy or phenoxy group, halogens such as fluorine, chlorine or bromine or the nitro group, finally also divalent radicals such as, e.g. the fused tetramethylene group.

$R_1$ and $R_2$ represent, for example, the methyl, ethyl or a propyl or butyl group; preferably, however, they are hydrogen. More particularly, the invention relates to a process for the production of aryl-substituted pyrazolines and pyrazolidines which consists in (a) Mixing a compound of the formula

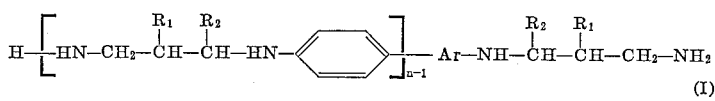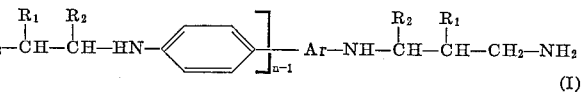

(I)

wherein

Ar represents an aromatic carbocyclic divalent radical with maximally 12 ring carbon atoms in the carbocyclic moiety,
each of $R_1$ and $R_2$, independently, is hydrogen or lower alkyl, and $n$ is an integer ranging from 1 to 2 and is 1 for Ar with more than 6 ring carbon atoms, with from $n$ to $n+1$ moles, per mole of said compound, of a hypohalogenite selected from the group consisting of an alkali metal hypochlorite, e.g., sodium or potassium hypochlorite, calcium hypochlorite, an alkali metal hypobromite, e.g., sodium or potassium hypobromite, calcium hypobromite, an ester of an alkanol of from 4 to 6 carbon atoms with hypochlorous acid and an ester of an alkanol of from 4 to 6 carbon atoms with hypobromous acid, for instance butyl or amyl hypochlorite or hypobromite, in an inert liquid aqueous medium at a temperature not exceeding room temperature;

(b) Permitting the reactants in said medium to react while maintaining the temperature thereof in the range between −10° C. and +120° C. of the reaction mixture, thereby obtaining a reaction end product consisting essentially of compounds of the formulae

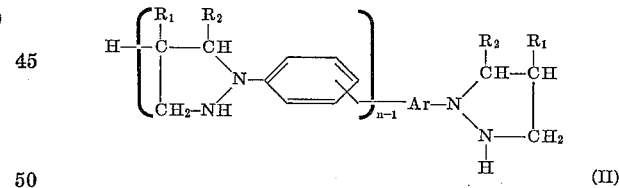

(II)

and

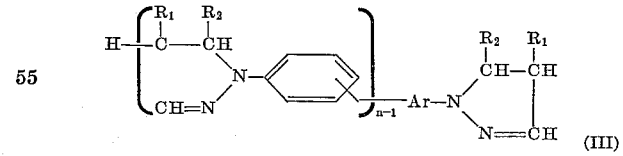

(III)

wherein Ar, $R_1$ and $R_2$ have the meanings given above;

(c) Maintaining the pH of the mixture in steps (a) and (b) at at least 7;

(d) Selectively steering the content of said Compounds II and III in said recreation end-product toward 100% of one of said compounds, as desired, by operating within the following limit conditions:

(α) Adding in step (a) about $n$ moles of said hypohalogenite per mole of said compound of Formula I and keeping the temperature in steps (a) and (b) in the range of −10° C. to 0° C., thereby obtaining essentially only a compound of Formula II, and (β) Adding more than $n$ and at most $n+1$ moles of said hypohalogenite per mole of said compound of Formula I in step (a), and maintaining the temperature in step (b) above room temperature and preferably at 100° to 120° C., thereby obtaining essentially only a compound of Formula III; and (e) Recovering the end-product from the reaction mixture.

The starting materials of Formula 2 used according to the invention are obtained by methods known per se, for example, by adding 1 mole of the nitrile of an α,β-unsaturated fatty acid such as acrylic acid nitrile, to 1 mole of the corresponding aromatic amine and subsequent hydrogenation of the nitrile to form the primary amine, or by condensing 1 mole of a 1,3-dichloro- or 1,3-dibromo-alkane with 1 mole of the desired aromatic amine and converting the 3-chlorol or 3-bromo-alkylarylamines obtained with ammonia in the corresponding 3-amino-alkyl-aryl compounds, or also by condensing 1 mole of an aromatic halogen compound containing a mobile halogen atom with 1 mole of a 1,3-diamino-alkane.

As stated above, the reaction of compounds of Formula 2 (or I, respectively) to the 1-aryl-hydropyrazoles of Formula 1 (II and/or III) is performed in an inert liquid aqueous medium, particularly water or in an inert organic solvent for the reactants which is preferably miscible with water, e.g., a lower alkanol such as methanol or ethanol or a lower saturated aliphatic ketone such as acetone. At the beginning of the reaction [step (a)] the temperature is advantageously kept as low as feasible, i.e., at temperatures ranging from well below the freezing point of water up to room temperature (+25° C.) and preferably at about −10° to 0° C., and it can then be raised to the boiling point of the mixture during the reaction, depending on the nature of the final products desired. The end-products which are substantially insoluble in water are isolated and purified by methods known per se, which comprise separation of the water-soluble, inorganic salts formed, and subsequent distillation or recrystallisation, preferably from ether.

In general, a mixture of 1-aryl-pyrazolines and 1-aryl-pyrazolidines is obtained by the process according to the invention. The content of pyrazoline in the final product is dependent upon the amount of the hypohalogenite used and on the reaction temperature applied.

When using an excess of about ½ mole of hypohalogenite or more, up to at most 1 mole excess, over the amount stoichiometrically required for the reaction with one mole of diamine, and at boiling temperature, a mixture containing about 50% or more of 1-aryl-pyrazoline is obtained, the balance of the mixture consisting essentially of 1-aryl-pyrazolidine.

On using about 2 moles of hypohalogenite per mole of diamine, a product consisting substantially of 1-aryl-aryl-pyrazolidine is obtained.

When using only one mole of hypahalogenite per mole of diamine and maintaining the reaction mixture at −10° to 0° C., a final product consisting essentially only of 1-aryl-pyrazolidine is obtained.

In contrast to the previously known methods, the process according to the invention gives very high, often even almost quantitative yields (90% by weight and higher) of 1-aryl-hydropyrazoles of Formula 1 and can be steered at will, as described above, toward substantially only the respective aryl-pyrazolidine (Formula II) or aryl-pyrazoline (Formula III), as desired. This is all the more surprising as, in view of the present state of the art, it was to be expected that the arylamino compound used as starting material would be halogenated or oxidised. A great advantage of the process according to the invention consists in the avoidance of aryl hydrazines as starting materials which always contaminate the industrial end-product and strongly discolour the same, and moreover, afford only yields in the order of 20 to 40%.

The 1-aryl-hydropyrazoles of Formula 1 obtained according to the invention are useful as protective agents against oxidation.

Since the substantially pure aryl-pyrazolidines are liquids, and the pure aryl-pyrazolines produced according to the invention form well defined crystals, their application as anti-oxidants in exact dosification is greatly facilitated in these forms compared with the uncrystallised tacky mixture thereof.

Further details can be seen from the following examples. The temperatures are given therein in degrees centigrade, weights in grams (g.), and volumes in millilitres (ml.).

*Example 1*

325 ml. of aqueous sodium hypochlorite solution (16.4% by volume of chlorine=0.75 mol) are added drop by drop within half an hour to 75 g. (0.5 mol) of N-phenyl-trimethylenediamine in a 750 ml. flask fitted with a thermometer, dropping funnel and stirrer. The addition is made while stirring well and cooling and in such a manner that the temperature does not rise above 20°. Cooling is then interrupted and the reaction mixture is stirred for 2 hours at room temperature. 50 ml. (0.5 mol) of concentrated sodium hydroxide solution are then added to the mixture and the whole is then refluxed for 1 hour. After cooling to 50°, the organic phase is separated and the aqueous salt solution is washed with 10 ml. of benzene. The organic phase and the benzene solution are then distilled.

67 g. (=90% of the theoretical) of an oil are obtained, B.P.$_{11}$ 140–142°. On titrimetric determination, this oil consists of 44% of 1-phenyl-pyrazolidine and 50% of 1-phenyl-pyrazoline.

When using instead of N-phenyl-trimethylenediamine, an equivalent amount of either N-(1'-naphthyl)-, N-(2'-naphthyl)-, N-(5'-acenaphthenyl)-, N-(4'-methoxyphenyl)-, N-(4'-benzyloxyphenyl)-, N-(4'-phenoxyphenyl)-, N-(4'-tert. butylphenyl)-, N-(3'-chlorophenyl)-, N-(4'-bromophenyl)-, N-(4'-nitrophenyl)-, N-(4'-cyclohexylphenyl)-, N-(4'-cyclohexyloxyphenyl)-, N-(3',4'-tetramethylenephenyl) - trimethylene - diamine or 1 - phenyl-amino-3-amino-1- or -2-methyl propane is used and otherwise the procedure described in the example is followed, then mixtures of 1-(1'-naphthyl)-, 1-(2'-naphthyl)-, 1-(5'-acenaphthyl)-, 1-(4'-methoxyphenyl)-, 1-(4'-benzyloxyphenyl)-, 1 - (4' - phenoxyphenyl)-, 1-(4'-tert. butylphenyl)-, 1-(3'-chlorophenyl)-, 1-(4'-bromophenyl)-,1-(4'-nitrophenyl)-, 1-(4'-cyclohexylphenyl)-, 1-(4'-cyclohexyloxyphenyl)- or 1-(3',4'-tetramethylenephenyl)-pyrazoline and -pyrazolidine or of 1-phenyl-5- or -4-methylpyrazoline and pyrazolidine or obtained in similar yields.

The same result is obtained on using sodium hypobromite instead of sodium hypochlorite with otherwise the same procedure.

*Example 2*

When in Example 1 instead of 325 ml. of sodium hypochlorite solution, 440 ml. thereof are used with otherwise the same procedure as described, then substantially only 1-phenyl-pyrazoline is obtained, which is separated as described in the preceding example and recrystallised from ether.

*Example 3*

Example 1 is repeated, but instead of 325 ml. of sodium hypochlorite solution, 220 ml. thereof are used and the temperature of the reaction mixture is maintained at −5° for about 5 hours. The resulting mixture is then processed as described in Example 1, and a final product consisting substantially only of liquid 1-phenyl-pyrazolidine is obtained.

*Example 4*

440 ml. of sodium hypochlorite solution are added drop by drop at such a rate, while well stirring and cooling for 30 minutes, to 150 g. of N,N'-bis-(3-aminopropyl)-benzidine in a flask fitted with stirrer, thermometer and dropping funnel, that the temperature does not rise above 0°. The reaction mixture is then stirred for a further 5 hours at 0°. 50 ml. of concentrated sodium hydroxide are then added to the mixture and the whole is left to stand for 2 hours at room temperature. The end-product so obtained, 4,4'-[bis-pyrazolidinyl-(1'')]-diphenyl of the formula

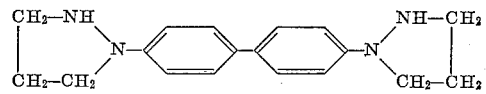

is filtered off and recrystallised from ether.

The starting material is prepared by hydrogenation of a solution of 198 g. of bis-(3-cyanoethyl)-benzidine in 1.2 litres of methanol which is saturated with ammonia at 4 atmospheres excess pressure. 40 g. of Raney cobalt is used as catalyst. The mixture is hydrogenated at 70-80° at 100 atmospheres excess pressure for 8 hours 15 minutes until no more hydrogen is taken up. The absorption of hydrogen amounted to 99.5% of the theoretical. The precipitated N,N-bis-(3-aminopropyl)-benzidine is recrystallised from 1 litre of chlorobenzene.

We claim:

1. A process for the production of aryl-substituted pyrazolines and pyrazolidines, which comprises
    (a) mixing a compound of the formula

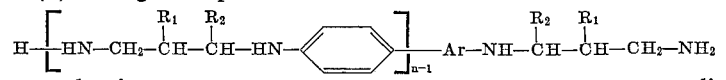

wherein
      Ar represents an aromatic carbocyclic divalent radical with maximally 12 ring carbon atoms in the carbocyclic moiety,
      each of $R_1$ and $R_2$, independently, is a member selected from the group consisting of hydrogen and lower alkyl, and
      $n$ is an integer ranging from 1 to 2, and is 1 for Ar with more than 6 ring carbon atoms,
   with from $n$ to $n+1$ moles, per mole of said compound, of a hypohalogenite selected from the group consisting of an alkali metal hypochlorite, calcium hypochlorite, an alkali metal hypobromite, calcium hypobromite, an ester of an alkanol of from 4 to 6 carbon atoms with hypochlorous acid and an ester of an alkanol of from 4 to 6 carbon atoms with hypobromous acid, in an inert liquid aqueous medium, at a temperature not exceeding room temperature;
    (b) permitting the reactants in said medium to react while maintaining the temperature thereof in the range between −10° C. and +120° C. of the reaction mixture, thereby obtaining a reaction end product consisting essentially of compounds of the formulae

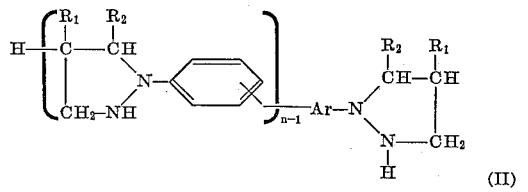

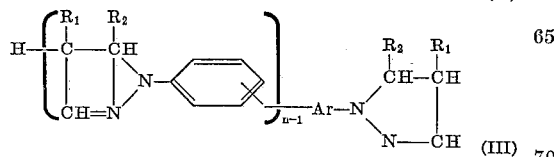

wherein Ar, $n$, $R_1$ and $R_2$ have the meanings given above;

(c) maintaining the pH of the mixture in steps (a) and (b) at at least 7;
    (d) recovering the end product from the reaction mixture.

2. In a process for the production of aryl-substituted pyrazolines and pyrazolidines, the step of mixing a compound of the formula

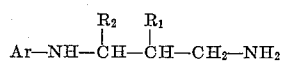

wherein Ar represents an aromatic carbocyclic radical which maximally 12 ring carbon atoms, and each of $R_1$ and $R_2$ independently of each other is a member selected from the group consisting of hydrogen and lower alkyl with, per mole of said compound, from an excess above one and up to a total of about two moles of a hypohalogenite selected from the group consisting of an alkali metal hypochlorite, calcium hypochlorite, an alkali metal hypobromite, calcium hypobromite, an ester of an alkanol of from 4 to 6 carbon atoms with hypochlorous acid and an ester of an alkanol of 4 to 6 carbon atoms with hypobromous acid in an inert liquid medium and raising the temperature above room temperature, thereby effecting ring closure between the two nitrogen atoms in the above formula and partial dehydrogenation, and thus obtaining a mixture consisting of from 50% to about 100% of the corresponding 1-aryl-pyrazoline and the balance substantially of 1-aryl-pyrazolidine.

3. A process for the production of aryl-substituted pyrazolidines, which comprises
    (a) mixing to react a compound of the formula

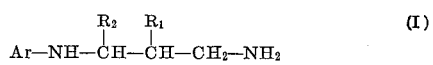

wherein Ar represents an aromatic carbocyclic radical with maximally 12 ring carbon atoms, and
      each of $R_1$ and $R_2$, independently, is a member selected from the group consisting of hydrogen and lower alkyl,
   with one mole, per mole of said compound, of a hypohalogenite selected from the group consisting of an alkali metal hypochlorite, calcium hypochlorite, an alkali metal hypobromite, calcium hypobromite, an ester of an alkanol of from 4 to 6 carbon atoms with hypochlorous acid and an ester of an alkanol of from 4 to 6 carbon atoms with hypobromous acid at a temperature of about −10° to +25° C. in an inert liquid medium and completing the reaction in a medium having a pH of at least 7, thereby obtaining a reaction product consisting essentially of 1-aryl-pyrazolidine of the formula

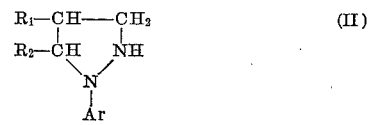

wherein Ar, $R_1$ and $R_2$ have the meaning given above, and
    (b) recovering the 1-aryl-pyrazolidine of Formula II from said reaction product.

4. A process for the production of aryl-substituted pyrazolines and pyrazolidines, which comprises
    (a) mixing a compound of the formula

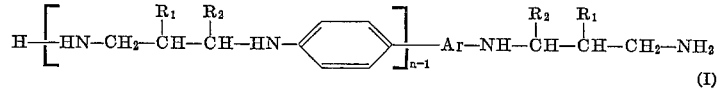

wherein Ar represents an aromatic carbocyclic divalent radical with maximally 12 ring carbon atoms in the carbocyclic moiety, selected from the group consisting of naphthyl, acenaphthyl, phenyl, and phenyl substituted by
lower alkyl, cyclohexyl, benzyl, phenyl, methoxy, ethoxy, cyclohexyloxy, benzyloxy, phenoxy, fluorine, chlorine, bromine, nitro, fused tetramethylene, and a radical represented by the formula

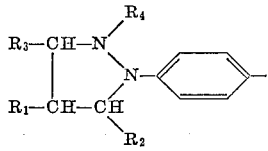

each of $R_1$ and $R_2$, independently, is a member selected from the group consisting of hydrogen and lower alkyl, $R_3$ and $R_4$ are members selected from the group consisting of hydrogen and the direct linkage if taken together, and $n$ is an integer ranging from 1 to 2, and is 1 for Ar with more than 6 ring carbon atoms, with from $n$ to $n+1$ moles, per mole of said compound, of a hypohalogenite selected from the group consisting of an alkali metal hypochlorite, calcium hypochlorite, an alkali metal hypobromite, calcium hypobromite, an ester of an alkanol of from 4 to 6 carbon atoms with hypochlorous acid and an ester of an alkanol of 4 to 6 carbon atoms with hypobromous acid, in an inert liquid aqueous medium, at a temperature not exceeding room temperature;

(b) permitting the reactants in said medium to react while maintaining the temperature thereof in the range between −10° C. and +120° C. of the reaction mixture, thereby obtaining a reaction end product consisting essentially of compounds of the formulae

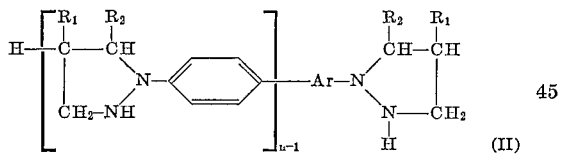

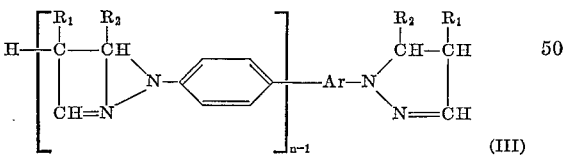

wherein Ar, $n$, $R_1$ and $R_2$ have the meanings given above;

(c) maintaining the pH of the mixture in steps (a) and (b) at at least 7;

(d) recovering the end product from the reaction mixture.

5. In a process for the production of aryl-substituted pyrazolines and pyrazolidines, the step of mixing a compound of the formula

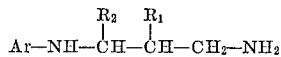

wherein Ar represents an aromatic carbocyclic radical with maximally 12 ring carbon atoms, selected from the group consisting of naphthyl, acenaphthyl, phenyl, and phenyl substituted by
lower alkyl, cyclohexyl, benzyl, phenyl, methoxy, ethoxy, cyclohexyloxy, benzyloxy, phenoxy, fluorine, chlorine, bromine, nitro, fused tetramethylene, and a radical represented by the formula

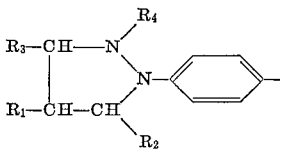

each of $R_1$ and $R_2$ independently of each other is a member
selected from the group consisting of hydrogen and lower alkyl, and $R_3$ and $R_4$ are members selected from the group consisting of hydrogen and the direct linkage if taken together with per mole of said compound, from an excess above one and up to a total of about two moles of hypohalogenite selected from the group consisting of an alkali metal hypochlorite, calcium hypochlorite, an alkali metal hypobromite, calcium hypobromite, an ester of an alkanol of from 4 to 6 carbon atoms with hypochlorous acid and an ester of an alkanol of 4 to 6 carbon atoms with hypobromous acid in an inert liquid medium and raising the temperature above room temperature, thereby effecting ring closure between the two nitrogen atoms in the above formula and partial dehydrogenation, and thus obtaining a mixture consisting of from 50% to about 100% of the corresponding 1-aryl-pyrazoline and the balance substantially of 1-aryl-pyraoline.

6. A process for the production of aryl-substituted pyrazolidines, which comprises
(a) mixing to react an compound of the formula

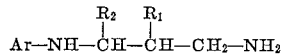

wherein Ar represents an aromatic carbocyclic radical with maximally 12 ring carbon atoms, selected from the group consisting of naphthyl, acenaphthyl, phenyl and phenyl substituted by
lower alkyl, cyclohexyl, benzyl, phenyl, methoxy, ethoxy, cyclohexyloxy, benzyloxy, phenoxy, fluorine, chlorine, bromine, nitro, fused tetramethylene and a radical represented by the formula

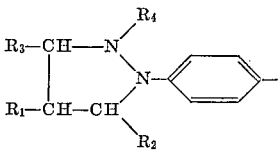

each of
$R_1$ and $R_2$, independently, is a member selected from the group consisting of hydrogen and lower alkyl and $R_3$ and $R_4$ are members selected from the group consisting of hydrogen and the direct linkage if taken together with one mole, per mole of said compound, of a hypohalogenite selected from the group consisting of an alkali metal hypochlorite, calcium hypochlorite, an alkali metal hypobromite, calcium hypobromite, an ester of an alkanol from 4 to 6 carbon atoms with hypochlorous acid and an ester of an alkanol of from 4 to 6 carbon atoms with hypobromous acid at a temperature of about −10° to +25° C. in an inert liquid medium and completing the reaction in a medium having a pH of at least 7, thereby obtaining a reaction product consisting essentially of 1-aryl-pyrazolidine of the formula

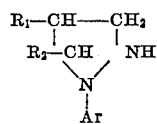

(II)

wherein Ar, $R_1$ and $R_2$ having the meaning given above and (b) recovering the 1-aryl-pyrazolidine of Formula II from said reaction product.

References Cited by the Examiner

Luttringhaus et al., Naturwissenschaften, vol. 44, page 442 (1957).

Luttringhaus et al., Chemische Berichte, vol. 92, pages 1756–65 (1959).

JOHN D. RANDOLPH, *Acting Primary Examiner.*

NICHOLAS S. RIZZO, NATALIE TROUSOF,
*Assistant Examiners.*